United States Patent
Jones et al.

[11] Patent Number: 5,961,093
[45] Date of Patent: Oct. 5, 1999

[54] SUPPORT PAD FOR AIR CONDITIONING CONDENSER UNIT OR THE LIKE

[75] Inventors: John P. Jones, Houston, Tex.; John D. Garrett, Vicksburg, Miss.

[73] Assignee: Polyvulc USA, Inc., Vicksburg, Miss.

[21] Appl. No.: 09/006,506

[22] Filed: Jan. 13, 1998

Related U.S. Application Data

[63] Continuation-in-part of application No. 08/782,415, Jan. 14, 1997.

[51] Int. Cl.⁶ .............................. F16M 1/00; A47B 91/00
[52] U.S. Cl. ........................................ 248/678; 248/346.01
[58] Field of Search ........................ 248/687, 688, 248/615, 638, 678, 346.01, 346.02, 346.03, 346.04

[56] References Cited

U.S. PATENT DOCUMENTS

| | | | |
|---|---|---|---|
| 1,578,121 | 3/1926 | Haw | 524/442 |
| 2,809,944 | 10/1957 | Sverdrup | 260/2.3 |
| 2,916,233 | 12/1959 | Ecker | 248/17 |
| 3,257,352 | 6/1966 | Ottenheym et al. | 260/41 |
| 3,757,481 | 9/1973 | Skinner | 52/265 |
| 3,788,581 | 1/1974 | Rutzick | 248/678 |
| 3,790,115 | 2/1974 | Fox et al. | 248/346.01 |
| 4,073,753 | 2/1978 | Hauge | 260/2.3 |
| 4,103,857 | 8/1978 | Levenhagen | 248/346.02 |
| 4,183,491 | 1/1980 | Sanders et al. | 248/346.02 |
| 4,189,125 | 2/1980 | Little | 248/346.02 |
| 4,250,222 | 2/1981 | Mavel et al. | 428/285 |
| 4,302,552 | 11/1981 | Hongu et al. | 521/176 |
| 4,397,246 | 8/1983 | Ishida et al. | 248/346.02 |
| 4,725,151 | 2/1988 | Orndorff, Jr. | 384/98 |
| 4,795,603 | 1/1989 | Nagayasu | 264/328 |
| 4,851,500 | 7/1989 | Lalwani et al. | 538/487 |
| 4,869,456 | 9/1989 | Jacobs | 248/346.02 |
| 4,911,985 | 3/1990 | Jenkins et al. | 428/446 |
| 4,946,725 | 8/1990 | Harlan | 248/346.01 |
| 4,970,043 | 11/1990 | Doan et al. | 265/237 |
| 4,973,642 | 11/1990 | Donstelli et al. | 528/15 |
| 5,010,122 | 4/1991 | Koski | 524/80 |
| 5,076,534 | 12/1991 | Adam | 248/678 |
| 5,157,082 | 10/1992 | Johnson | 525/237 |
| 5,312,573 | 5/1994 | Rosenbaum et al. | 264/37 |
| 5,397,825 | 3/1995 | Segrest | 524/270 |
| 5,428,093 | 6/1995 | Lee | 524/317 |
| 5,438,078 | 8/1995 | Butcher, Jr. et al. | 521/41 |
| 5,439,735 | 8/1995 | Jamison | 428/255 |
| 5,505,008 | 4/1996 | Hugo et al. | 34/403 |
| 5,506,274 | 4/1996 | Brown | 521/41 |
| 5,509,610 | 4/1996 | Gibbons et al. | 241/37 |
| 5,514,721 | 5/1996 | Hart | 521/41 |
| 5,525,416 | 6/1996 | Katz et al. | 428/283 |
| 5,580,022 | 12/1996 | Bach et al. | 248/346.01 |
| 5,604,277 | 2/1997 | Osborn | 524/322 |
| 5,635,551 | 6/1997 | Lee | 525/232 |
| 5,749,555 | 5/1998 | Albrect | 248/346.01 |
| 5,758,855 | 6/1998 | Jordan et al. | 248/346.01 |

*Primary Examiner*—Ramon O. Ramirez
*Assistant Examiner*—Michael Nornberg
*Attorney, Agent, or Firm*—Akin, Gump, Strauss, Hauer & Feld

[57] ABSTRACT

This invention is a support pad formed of a solidified mixture comprising crumb rubber and sufficient recycled polyethylene to bond the crumb rubber together. The composition has sufficient resiliency to dampen noise created by vibration of a condenser or other equipment positioned on the pad. The pad is lightweight and has sufficient strength to support the weight of an air conditioning condenser unit or similar equipment.

16 Claims, 3 Drawing Sheets

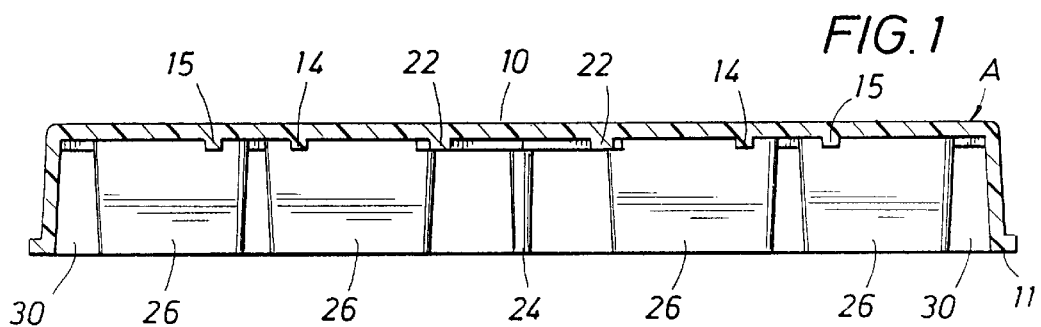
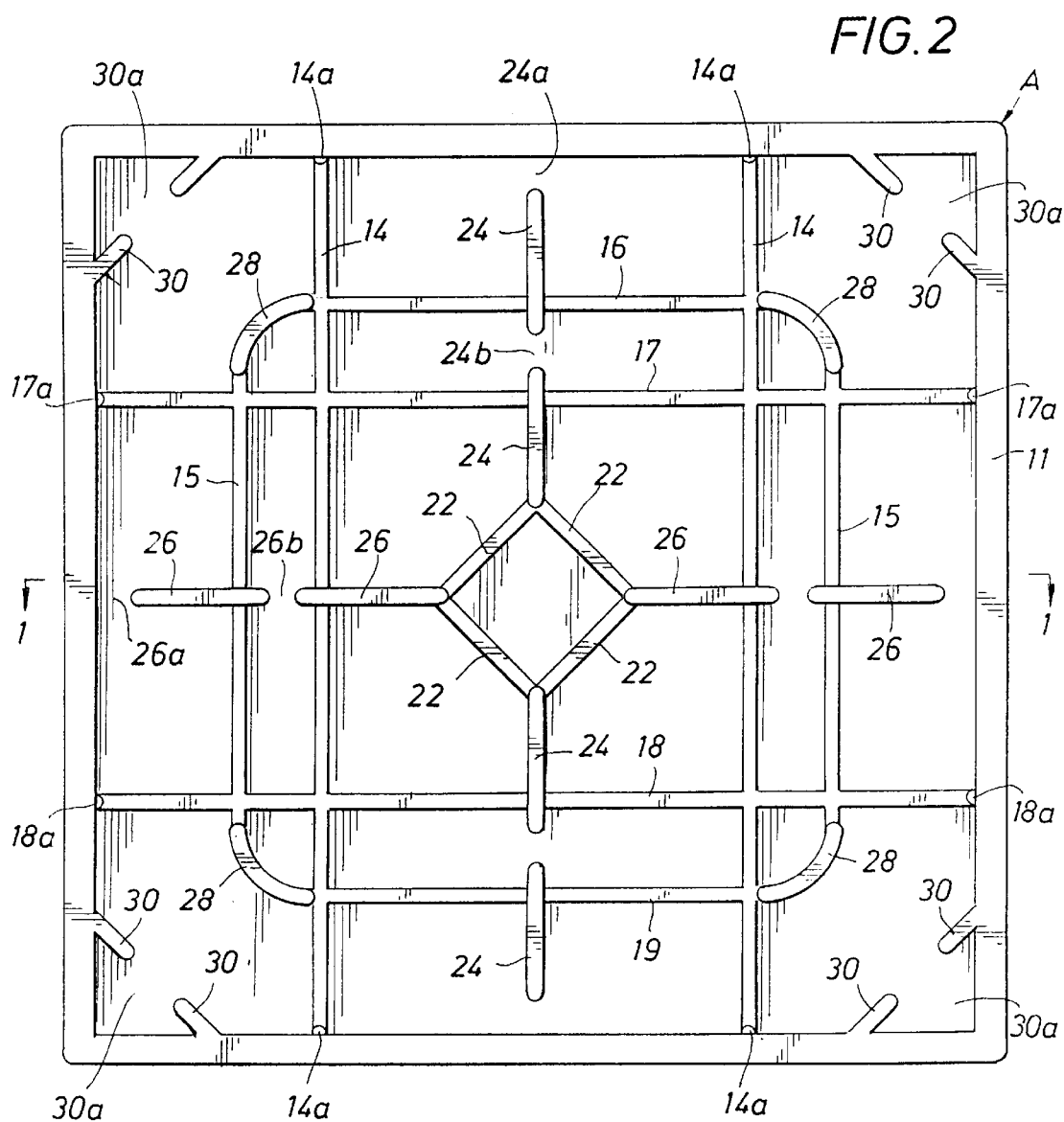

FIG. 3
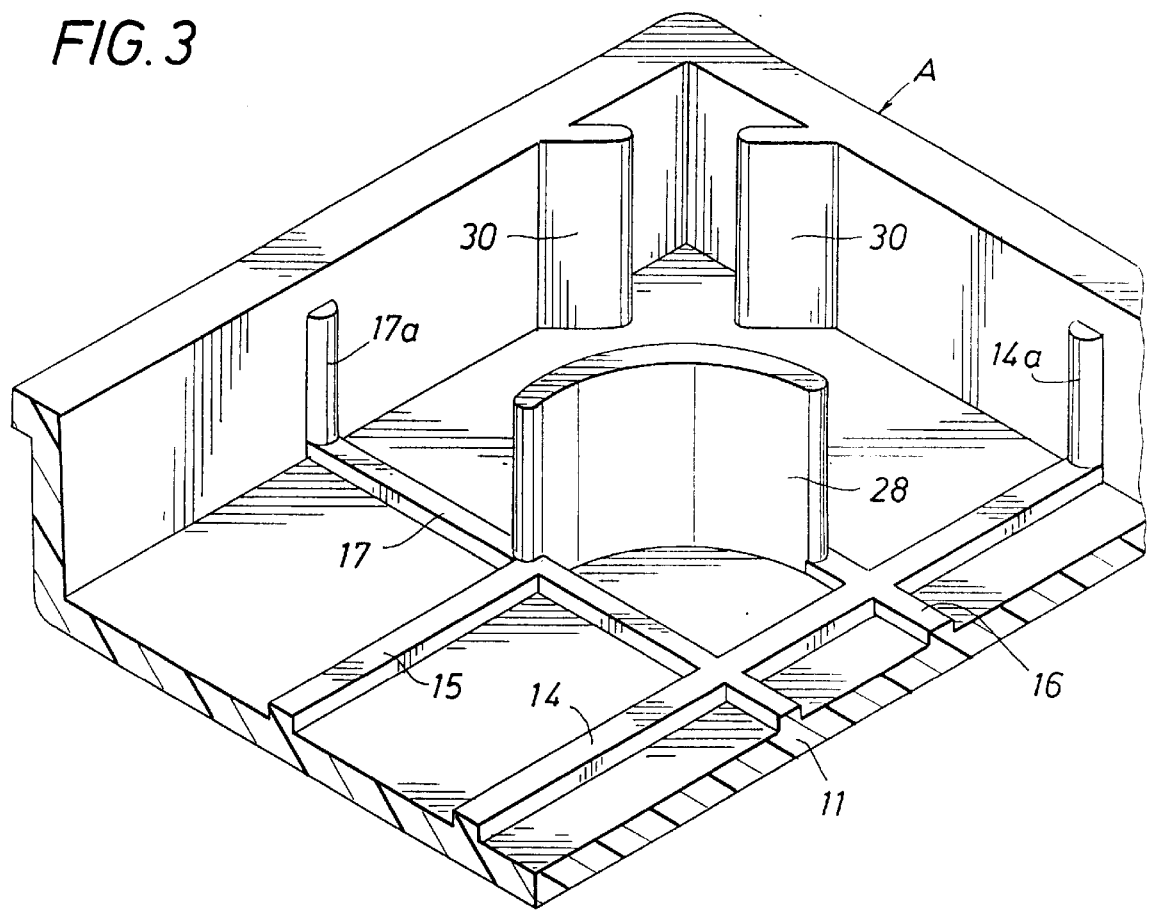
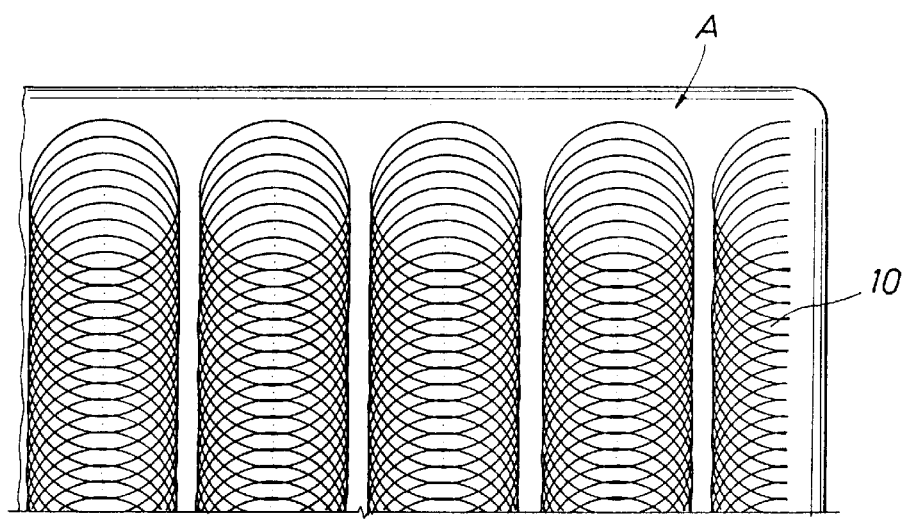
FIG. 4

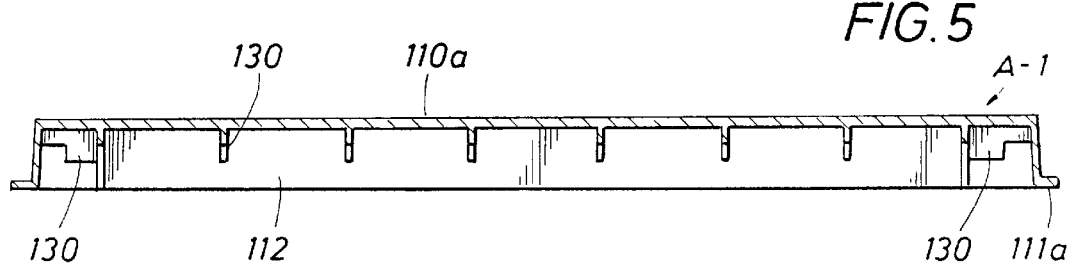
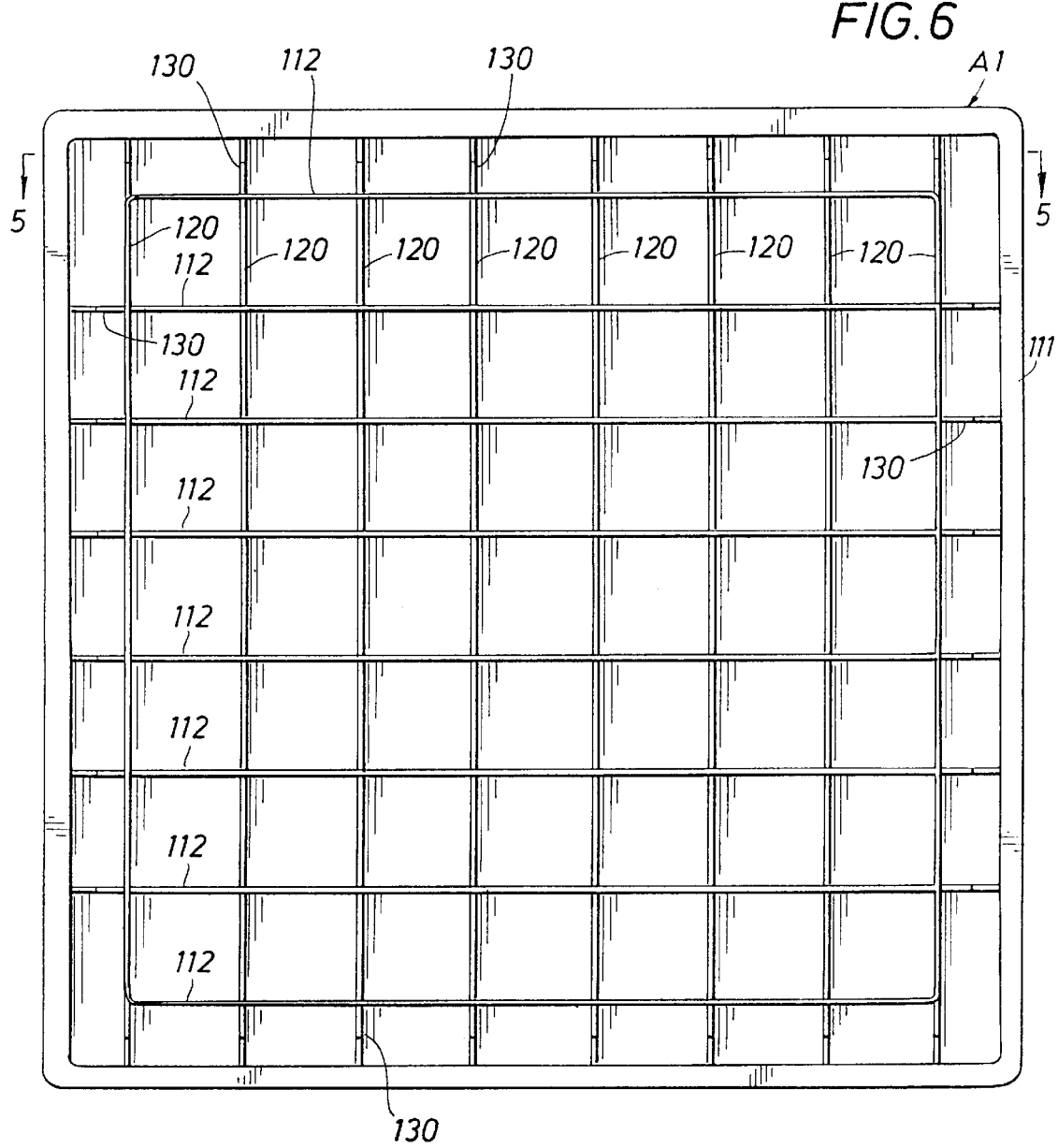

SUPPORT PAD FOR AIR CONDITIONING CONDENSER UNIT OR THE LIKE

CROSS-REFERENCE TO RELATED APPLICATIONS

This is a continuation-in-part of U.S. patent application Ser. No. 08/782,415 filed Jan. 14, 1997, and is entitled to the filing date thereof for all common subject matter.

STATEMENT REGARDING FEDERALLY SPONSORED RESEARCH OR DEVELOPMENT

None.

BACKGROUND OF THE INVENTION

It is common today to support condensers and other components of air conditioning units on a support pad which is either positioned on the ground or other base. The most common material used today for the pads is concrete, but as indicated in some of the prior art patents, other materials have been used for such pads. For example, U.S. Pat. No. 2,916,233 discloses a pump base formed of concrete in the shape of a block. U.S. Pat. No. 3,790,115 discloses the use of pads made of concrete, wood covered with sheet metal, and a polyethylene resin, either of the expanded or solid type. U.S. Pat. No. 4,073,753 discloses an outdoor surface composition for surfacing outdoor playing areas or other utility areas which comprises a mixture of particulate reclaimed rubber and inorganic particulate solids, such as sand, mixed together and compacted. It was also suggested that for some applications, organic particulate solids, such as wood chips, peat, manure or cinders, may be included with the composition.

So far as known, the prior art has not disclosed or even suggested forming a pad having a composition which is largely a mixture of recycled crumb rubber and recycled polyethylene.

BRIEF SUMMARY OF THE INVENTION

This invention relates to a strong, light-weight support pad which is preferably square or rectangular in shape and has a depth of at least two inches for supporting an air conditioning condenser unit or the like, wherein the material of the pad is a mixture comprising recycled crumb rubber and sufficient recycled polyethylene to bond the crumb rubber together in a high strength resilient solidified pad.

BRIEF DESCRIPTION OF THE VIEWS OF THE DRAWINGS

FIG. 1 is a cross-sectional view of the air conditioner condenser pad unit of this invention in the form that is used for less than 2000 square inches in surface area, taken on line 1—1 of FIG. 2.

FIG. 2 is abo view of the pad of FIG. 1 showing in detail the arrangement of the stiffening ribs;

FIG. 3 is a detail view of one corner of the pad of FIG. 1 and FIG. 2, showing in particular the arrangement of the supporting ribs, at the corner and at an intermediate point;

FIG. 4 is a graphic illustration of portion of the exterior surface of the pad, showing the non-skid surface graphically;

FIG. 5 is a cross-sectional view of a modified pad construction which is primarily used for pads having greater than 2000 square inches of surface area, and it is taken on line 5—5 of FIG. 6; and FIG. 6 is a bottom plan view of the pad of FIG. 5, showing the reinforcing ribs that are molded into the pad.

DETAILED DESCRIPTION OF THE INVENTION

As indicated above, there have been many efforts in the past to provide a support pad for supporting an air conditioning compressor unit or the like. The present invention solves the problems of the past by providing a strong, light-weight support pad for such purpose wherein a molded body is formed of a mixture comprising recycled crumb rubber and sufficient recycled polyethylene to bond the crumb rubber together into a resilient solidified pad, with the amount of the crumb rubber preferably being about 25 percent, but may be in the range of about 20 to about 40 percent by weight of the total mixture. The "crumb rubber" as used herein refers to rubber of small particle size in the range of 10–200 mesh, and preferably 30–40 mesh which has been ground or buffed from a scrap rubber tire, in which virtually all metal and non-rubber fibers are removed. The rubber may be either natural or synthetic rubber found in automobile and/or truck tires.

The polyethylene used in the composition of this invention is preferably recycled polyethylene, and it may be an expanded polyethylene resin such as disclosed in U.S. Pat. No. 3,790,115, or a solid polyethylene, so long as the polyethylene is capable of being heated and softened for mixing with the crumb rubber to bond the crumb rubber together. Although it is preferred to have the crumb rubber and the polyethylene as essentially the only components in the pad, impurities or other materials may be present so long as they do not interfere with bonding of the polyethylene and the crumb rubber into the pad.

Example: By way of example, the product of this invention is molded from:

about 50% by weight of high density polyethylene (HDPE)

about 20—about 40% by weight of crumb rubber having the particle size in the range of 10–200 mesh about 5% by weight of low density polyethylene (LDPE)

about 5% by weight of polypropylene film scrap about 5% by weight of nylon scrap about 9% by weight of $CaCO_3$ or flyash about 0.1% by weight of an anti-oxidant about 0.04% by weight of calcium stearate about 0.5% by weight of pigment (black)

It is preferred to have from 90–99.5% by weight recycled material. If the $CaCO_3$ is eliminated and the flyash is substituted, then the material is about 99% recycled. This is important because the present invention does not utilize much virgin material, which is more expensive, although the recycled polyethylene is more difficult to process than virgin polyethylene.

The amount of rubber is limited to having a minimum of at least about 20% by weight to provide enough weight for the pad to resist deformation in use. The amount of rubber may be more than 40% by weight, but the weight becomes excessive for moving it into place for an air conditioning pad at the higher weights of rubber.

For example, in the manufacture of the composition of this invention into a pad, the crumb rubber which serves as the feedstock does not have to be absolutely free of dirt or other contaminants, so long as any contaminants do not interfere with the bonding of the rubber and the polyethylene together. This is a distinct advantage in that the crumb rubber does not normally have to go through an expensive cleaning process before mixing with the polyethylene.

The combination composition of crumb rubber and polyethylene has distinct advantages over polyethylene alone for a base for an air conditioning condenser unit or the like because of its being similar in weight and yet having greater strength and rigidity to support the condenser. The crumb rubber-polyethylene mixture is sufficiently resilient so as to provide a dampening of noise that is generated by the condenser unit positioned on the pad more effectively than a pad of polyethylene alone. The pad also withstands ultraviolet light degradation over an extended period of time.

The pad of this invention is preferably made by injection molding but can alternatively be made by compression molding.

Typically, the pad of this invention is square or rectangular and is at least several inches in depth from its top portion to its bottom surface, but that depth may vary from about two to about five inches, depending upon the weight and size of the unit which is being supported by the pad. In the preferred embodiment, the pad is not completely solid throughout the body. Instead, the area of the pad to the interior of the pad perimeter and below the top portion is substantially hollow except for internal integrally molded stiffening ribs of suitable configuration which provide strength and rigidity to the top portion of the pad which supports the condenser. The top portion sidewalls forming the perimeter and stiffening ribs are preferably each three to two inches in width or thickness so as to reduce the overall weight of the pad. Although the pad preferably has an external dimension which is square or rectangular and is large enough to fit under the entire horizontal area of the condenser unit or other unit positioned thereon, it may have other shapes or dimensions.

By way of an example of a pad made with the above composition, FIGS. 1–4 and FIGS. 5-6 show two configurations which provide enough strength while being lightweight enough to be easily moved around and placed in position by one person.

Referring now in particular to FIGS. 1–4, which show the first embodiment of this invention, the unit A is preferably molded by injection molding so that it can be placed on the ground, with its upper surface 10 being a non-skid surface for receiving the air conditioning compressor unit and with the lower surface 11 resting on the ground. The lower surface 11 extends around the entire unit and forms the perimeter of the unit A. The upper surface 10 is essentially flat.

Looking at the unit from the bottom side, the reinforcing ribs can be seen, wherein a relatively shallow grid is formed by longitudinal members 14 and 15, which are intersected with transverse members 16, 17, 18, and 19. The reinforcing ribs 14 extend to the inside of the perimeter molding 11, forming vertically extending ribs 14a. Likewise, vertically extending ribs 17a and 18a are also formed on the inside wall on the surface of the unit A.

The center portion of the unit is reinforced by a diamond-shaped support formed of relatively short ribs 22. The ribs 22 are at the center of the pad A where they provide the reinforcing at the weakest point of the pad.

The pad has longitudinal reinforcing ribs which extend from the upper inner surface pad to the ground so that the lower surfaces of such ribs 24 are on the ground as is the lower surface 11 of the pad A.

There are also four laterally extending ribs 26 which extend to the ground.

At each corner, spaced inwardly from the outer perimeter 11 are curved ribs 28 which extend all of the way to the ground. The ribs 24, 26, and 28 take the primary weight of the air conditioning compressor unit. Such ribs are formed with spaces 24a, 24b, 26a, and 26b to prevent warping of the pad during the curing/cooling.

At the corners of the unit A, each corner has a pair of support ribs 30 which extend to the ground. The ribs 30 are split so as to leave a space 30a therebetween for each corner to prevent warping of the unit A while curing/cooling. Preventing warping is important because it assures that the units A can be stacked and are stable when stacked.

It should be noted that the curved ribs 28 are spaced inwardly from the perimeter 11 so as to be approximately at the outer extremities of the air conditioning compressor unit. The non-skid surface 10 is to eliminate movement of the air conditioning compressor unit during vibration of the unit so that the air conditioner compressor unit does not "walk" or move around on the unit A.

Referring now to FIGS. 5 and 6, the unit A-1 has an outer perimeter 111 which has its lower surface 111a resting on the ground and its upper surface 110a provided with a non-skid surface.

Internally of the mold for the unit A-1 is a grid of reinforcing members 112 which extends laterally across the unit A-1, each of which extends to the ground. Longitudinal reinforcing ribs 120 extend longitudinally and also extend to the ground, except at the outer extremities. At each outer extremity a reinforcing rib 130 of an L shape provides support for each of the ribs.

The composition of the pad of this invention is lightweight compared to concrete alone and generally falls within the range of about 0.02 to about 0.04 pounds per cubic inch. By reason of being lightweight with the adequate strength provided by the composition of the invention, the pad may be readily handled manually by one person for positioning the pad prior to placing the condenser unit on the pad. Also, sometimes air conditioning condensers and other equipment on a concrete pad vibrate and create noise, which is dampened by the resiliency of the composition of the pad of this invention. The strength of the pad is great enough to resist breaking or cracking as compared to a concrete pad when loading the condenser unit on the pad and during the use of the pad with the condenser unit or other equipment on the pad.

Having described the invention above, various modifications of the techniques, procedures, material, and equipment will be apparent to those in the art. It is intended that all such variations within the scope and spirit of the appended claims be embraced thereby.

What is claimed is:

1. A support pad for resting on a receiving surface and supporting an air conditioner compressor unit, comprising:

a molded body made from crumb rubber and scrap plastic which has a perimeter wall adapted to be placed on the receiving surface and an upper planar member attached to the perimeter wall for receiving the air conditioner compressor unit, the perimeter wall having corners;

said body having a plurality of vertical support ribs that extend from the underside of the upper planar member to even with the bottom of the perimeter wall;

each of said vertical support ribs being spaced from and unattached to the perimeter wall for preventing warpage of the body during curing; and a pair of molded reinforcing ribs depending from the underside of the upper planar member and attached to the perimeter wall at each corner so as to form a triangular shape with the perimeter wall at the corner, said pair of molded reinforcing ribs extending from the underside of the upper planar member to even with the perimeter wall.

2. The pad of claim 1, wherein
said crumb rubber is present in a range of about 20% to about 40% by weight.

3. The pad of claim 1, wherein
said body is molded by either injection or compression molding.

4. The pad of claim 1, wherein
the scrap plastic comprises polyethylene, and the polyethylene and the crumb rubber are substantially free of any impact modifier or coupling aid.

5. The pad of claim 1, wherein
the body comprises a mixture of polyethylene and crumb rubber, wherein the mixture consists substantially only of about 99% by weight of crumb rubber and scrap polyethylene bonded together.

6. The pad of claim 1, wherein
the density of the body is within the range of about 0.02 to about 0.04 pounds per cubic inch.

7. The pad of claim 1, wherein
the crumb rubber is natural and/or synthetic rubber.

8. The pad of claim 1, wherein
the crumb rubber is substantially free of metal and non-rubber fibers.

9. The pad of claim 1, wherein
said body is an integral molded body having a depth from the upper surface to the bottom surface of at least several inches, and is generally hollow except for said plurality of vertical support ribs, further comprising a grid of shallow reinforcing ribs depending from the underside of the upper planar member, but not extending as far as even with the perimeter wall, said shallow reinforcing ribs being attached to the perimeter wall.

10. The support pad of claim 1, further including
curved corner ribs spaced inwardly from said perimeter wall and extending downwardly from the underside of the upper planar member for resting on the receiving surface.

11. The support pad of claim 1, further including
a plurality of additional ribs molded with the body and extending to a point intermediate between the underside of the upper planar member and the bottom of the perimeter wall for providing strength with a minimum of weight.

12. The support pad of claim 1, wherein the composition of the body comprises at least about 90 weight percent recycled material.

13. The support pad of claim 1, wherein the composition of the body comprises from about 20 weight percent to about 40 weight percent crumb rubber and at least about 50 weight percent scrap polyethylene, the crumb rubber having a particle size from about 200 mesh to about 10 mesh, the body having a density within the range of about 0.02 to about 0.04 pounds per cubic inch.

14. A pad for supporting an air contitioning condenser unit, the pad being made primarily from recycled materials, comprising:

a box-shaped body having an upper planar member and depending sidewalls, the body having an open bottom side and being substantially hollow except for a plurality of vertical support members depending from the underside of the upper planar member and extending even with the bottom of the sidewalls for providing vertical support for the air conditioning condenser unit;

the body having a composition comprising at least about 20 weight percent crumb rubber and at least about 50 weight percent scrap polyethylene so that the crumb rubber and the scrap polyethylene comprise at least about 90 weight percent of the body;

the crumb rubber being formed by grinding or buffing used tires and having a rubber particle size ranging from about 200 mesh to about 10 mesh;

the crumb rubber being dispersed throughout the polyethylene, the polyethylene and the crumb rubber being injection or compression molded to form the body as an integral unit;

the polyethylene being the bonding agent that holds the body together;

the body having a density ranging from about 0.02 pounds per cubic inch to about 0.04 pounds per cubic inch; and the composition including $CaCO_3$ or flyash.

15. The pad of claim 14, wherein the vertical support members are unattached to and spaced from the sidewalls.

16. The pad of claim 15, further comprising a grid of shallow reinforcing ribs attached to the sidewalls and the upper planar member, wherein the shallow reinforcing ribs depend from the underside of the upper planar member, but do not extend as far downwardly as the vertical support members, the shallow reinforcing ribs providing reinforcement while adding little additional weight.

* * * * *